Patented May 27, 1941

2,243,736

UNITED STATES PATENT OFFICE 2,243,736

PROCESS OF PRODUCING ARTIFICIAL LEATHER

Fritz Löblein, Eilenburg, Germany, assignor to Deutsche Celluloid-Fabrik Aktiengesellschaft, Eilenburg, Germany No Drawing. Application May 24, 1938, Serial No. 209,723. In Germany June 3, 1937

1 Claim. (Cl. 154—2)

This invention relates to the manufacture of a novel kind of artificial leather.

The frequent application of artificial leather which has hitherto been made almost exclusively on a nitrocellulose basis chiefly resides on the ease with which plasticized nitrocellulose masses can be embossed by stamping, so that the artificial leather can be given the desired grain necessary for imitating any particular leather. By a suitable varnishing of the grain surface it is not only possible to produce all the desired gradations of color tone and appearance, but there is also developed a surface hardness approximating that of natural leather, since the latter is also generally treated with nitrocellulose varnishes.

Although it has frequently been proposed to use polymerizates and mixed polymerizates of the vinyl group for making leather-like products, there are still no such products on the market.

The application to such polymerizates of the continuous process usual in the production of artificial leather from nitrocellulose, in which the grain is imprinted by means of calender rollers and the depressions thus produced then receive a varnish colored differently from the fundamental tint and applied by a spatula, is not successful because the grain is only imperfectly imprinted and has a tendency to disappear. Moreover, special precautions are necessary to secure adhesion of the differently colored varnish to the bottom foil.

It is an object of the invention to produce artificial leather from vinyl polymers having a durable and multi-colored grain.

Further objects will become apparent from the detailed description following hereinafter.

The process is carried out as follows:

A support, such as a textile fabric, paper or the like, is gradually united by pressure and heat with at least two differently colored layers of vinyl polymers containing the same or different contents of softeners, the layers being applied successively and superimposed one upon the other, whereupon the lower layer, which is of the same hardness as, or harder, or softer than the upper layer, is laid bare by deeply graining. This exposure of the lower layer by a cutting and shifting of the upper layer causes simultaneously changes in thickness of the upper layer. In contrast with the known process, therefore, the cross section through the new artificial leather produced by the present invention is not of uniform thickness throughout, but has a thickness which varies correspondingly with the grain of the graining roller, so that the zones of the upper layer immediately in the neighbourhood of the exposed lower layer have a greater thickness than that of the zones somewhat removed from this neighbourhood. It is recommended to produce the grain with slightly warmed calender rollers, a temperature above the softening point of the layer of artificial leather sufficing. The process is not limited to the use of softening agents, but it may also be employed in those cases where the necessary elasticity of the artificial leather is obtained by using an elastic polymerizate or mixed polymerizate of the vinyl group, for example a polyacrylic acid methylester or a mixed polymerizate with vinyl chloride containing chiefly acrylic acid methylester alone or in a mixture with other vinyl polymers.

The multi-colored grain effect thus obtained is durable, that is to say it does not subsequently become distorted when the leather is removed from the roller or during later operations or in actual use of the material where the artificial leather is frequently subject to continuous light tension. Nor does this grain tend to disappear as the temperature rises.

For the manufacture of durably grained artificial leather having a two- or multi-color effect, the following polymers of the vinyl group are suitable, for instance polyvinyl chloride, afterchlorinated polyvinyl chloride, polystyrene, polyacrylic acid derivatives, derivatives of polymethyl acrylic acid, polyvinyl ethers, polyvinyl acetals, polyvinyl alcohol and its esters with organic acids, polyvinyl acetateacetals, mixed polymerizates of the monomerides forming the basis of the aforesaid polymerizates with each other or with other monomerides which are polymerizable only in mixtures, especially the mixed polymerizates from vinyl chloride and maleic acid derivatives; also the mixtures of the polymerizates and mixed polymerizates with each other.

The following is an example of the invention:

A sheet is rolled from polyvinyl chloride or a mixed polymerizate of vinyl chloride with an ester of acrylic acid containing 55 parts of the polymerizate and 32 parts of a softening agent, for example an ester of phthalic acid, and 13 parts of Chestnut-Brown (Schultz, Farbstoffstabellen, 7th ed., vol. I, No. 1,459). This sheet is united in known manner by pressure and heat with a suitable fabric or paper support.

On this artificial leather is then affixed a second sheet consisting of 55 parts of the same or a similar polymerizate with 32 parts of softening agent and 13 parts of Cadmium-Red. For producing the grain this double layer is gradually passed through a graining calender and imprinted with a deep grain while raising the temperature to slightly above the softening point of the resins. The upper red layer is thus so cut up corresponding with the elevations of the relief roller that the lower layer is exposed and the other color is visible in the depressions of the grain.

In making the differently colored covering layer, the same softener or mixture of softeners as is used in the undermost layer or different softeners may be employed. The proportion of softener to the vinyl polymerizate may be varied to suit the purpose in view. By suitable choice of the differently colored pigments, many variations in the appearance of the artificial leather may be produced and the possible variations are multiplied if three or more different layers are superimposed and imprinted with the deep grain.

This durably grained artificial leather having multi-color effects may be made of any desired quality and strength and is useful in all the applications of artificial leather.

What I claim is:

Process of producing artificial leather from vinyl polymerides having a durable multi-colored grain, which process comprises applying at least two differently colored elastic foils from vinyl-polymers in superimposition to a support, heating and pressing said foils onto said support to cause said foils to adhere to said support, and calendering the article thus produced to shift away and crumple up parts of the top layer so that the lower layer is exposed in places and the color of the lower layer visible in the depressions.

FRITZ LÖBLEIN.